United States Patent [19]
Wehner et al.

[11] Patent Number: 5,534,566
[45] Date of Patent: Jul. 9, 1996

[54] STABILIZED HALOGEN-CONTAINING POLYMERS

[75] Inventors: Wolfgang Wehner, Ober-Ramstadt; Rolf Drewes, Lindenfels; Karl J. Kuhn, Lautertal; Hans-Jürgen Sander, Lorsch; Markus Kolb, Plankstadt, all of Germany

[73] Assignee: Ciba-Geigy Corporation, Tarrytown, N.Y.

[21] Appl. No.: 419,311

[22] Filed: Apr. 10, 1995

[30] Foreign Application Priority Data

Apr. 15, 1994 [CH] Switzerland .................. 1143/94

[51] Int. Cl.$^6$ .................................. C08K 5/053
[52] U.S. Cl. ............... 524/27; 252/407; 252/400.52; 524/56; 524/109; 524/387; 524/419; 524/450
[58] Field of Search ............. 524/56, 27, 387, 524/109, 398, 403; 523/128, 179; 252/401.52, 407

[56] References Cited

U.S. PATENT DOCUMENTS

| | | | |
|---|---|---|---|
| Re. 25,451 | 10/1963 | Hecker et al. | 524/387 |
| 2,564,194 | 8/1951 | Leendert et al. | 524/109 |
| 3,142,659 | 7/1964 | Buckley | 524/387 |
| 3,453,225 | 7/1969 | Pollock | 524/387 |
| 3,483,915 | 12/1969 | Girard | 524/27 |
| 4,000,100 | 12/1976 | Baldyga | 524/450 |
| 4,060,512 | 11/1977 | Scheidl et al. | 524/397 |
| 4,221,687 | 9/1980 | Minagawa et al. | 524/357 |
| 4,356,110 | 10/1982 | Sallmén et al. | 524/387 |
| 4,379,882 | 4/1983 | Miyata | 524/436 |
| 5,055,284 | 10/1991 | Andrews et al. | 423/419 |
| 5,102,933 | 4/1992 | Bae et al. | 524/387 |
| 5,194,470 | 3/1993 | Carette et al. | 524/399 |
| 5,236,981 | 8/1993 | Arfiche et al. | 524/423 |
| 5,360,859 | 11/1994 | Ogawa et al. | 524/437 |
| 5,376,707 | 12/1994 | Nakatsuji et al. | 524/56 |

FOREIGN PATENT DOCUMENTS

| | | |
|---|---|---|
| 54-56646 | 5/1979 | Japan . |
| 63-063737 | 3/1988 | Japan . |
| 63-105408 | 5/1988 | Japan . |
| 4-348165 | 12/1992 | Japan . |

OTHER PUBLICATIONS

Derwent Abstract 88–116659 of JP-A-63 063737.

*Primary Examiner*—Veronica P. Hoke
*Attorney, Agent, or Firm*—Michele A. Kovaleski

[57] ABSTRACT

Use of a di- or polysaccharide alcohol and an inorganic or organic zinc, aluminum or rare-earth compound allows a high degree of stabilization of a halogen-containing polymer or polymer recyclate.

15 Claims, No Drawings

STABILIZED HALOGEN-CONTAINING POLYMERS

The invention relates to stabilized halogen-containing polymers or recyclates thereof, preferably polyvinyl chloride (PVC) or recyclates thereof, and a stabilizer mixture comprising a di- or polysaccharide alcohol, and to a process for the preparation of stabilized halogen-containing polymers.

In addition to compounds of tin and lead, PVC can also be stabilized using fatty acid salts, known as metal soaps, where the metals are usually barium, cadmium, zinc, magnesium or calcium. In view of the different stabilization properties (initial colour, colour retention and long-term stability), a combination of two different metal soaps, for example Ba/Cd soaps, is in each case employed in order to achieve balanced stabilization. In order to avoid the use of barium-, lead- or cadmium-containing compounds, Ca/Zn soaps have also been proposed; cf. in this respect, for example, "Taschenbuch der Kunststoff-Additive" [Handbook of Plastics Additives], editors R. Gächter and H. Müller, Hanser Verlag, 3rd Edition, 1990, pages 308–309, and "Kunststoff-Handbuch PVC" [Plastics Handbook PVC], Volumes 1 and 2, Beck/Braun, Carl Hanser Verlag, 2nd Edition, 1985/1986.

It is also proposed, inter alia, to use, as costabilizers for PVC, polyols or maltitol in the presence of a combination of calcium and zinc soaps; examples are given in JP 63–063, 737.

However, there continues to be a demand for a physiologically acceptable stabilizer system which at the same time enables a high degree of stabilization. In particular, stabilizer systems containing barium, lead or cadmium should be avoided.

It has now been found that certain di- or polysaccharide alcohols mixed with a zinc, aluminium or rare-earth compound give halogen-containing polymers excellent long-term stability with good initial colour and colour retention.

The invention thus relates to a stabilized halogen-containing polymer comprising (a) a halogen-containing polymer or a recyclate thereof, (b) a di- or polysaccharide alcohol of the formula $C_6H_{11}O_6(C_6H_{10}O_5)_nC_6H_{13}O_5$, in which n is a number between 0 and 5; and (c) an inorganic or organic zinc, aluminium or rare-earth compound, where, if component (b) is maltitol, the composition does not comprise a combination of a calcium and zinc soaps.

A halogen-containing polymer stabilized in this way preferably contains no compounds of barium, lead or cadmium.

The halogen-containing polymers or recyclates thereof are preferably chlorine-containing, for example polymers of vinyl chloride, vinyl resins containing vinyl chloride units in their structure, such as copolymers of vinyl chloride and vinyl esters of aliphatic acids, in particular vinyl acetate, copolymers of vinyl chloride with esters of acrylic and methacrylic acid and with acrylonitrile, copolymers of vinyl chloride with diene compounds and unsaturated dicarboxylic acids or anhydrides thereof, such as copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and other polymerizable compounds; polymers of vinyl chloroacetate and dichlorodivinyl ether; chlorinated polymers of vinyl acetate, chlorinated polymeric esters of acrylic acid and alpha-substituted acrylic acid; polymers of chlorinated styrenes, for example dichlorostyrene; chlorinated rubbers; chlorinated polymers of ethylene; polymers and post-chlorinated polymers of chlorobutadiene and copolymers thereof with vinyl chloride, rubber hydrochloride and chlorinated rubber hydrochloride; and mixtures of said polymers with one another or with other polymerizable compounds.

Also suitable are graft polymers of PVC with EVA, ABS and MBS. Preferred substrates are also mixtures of the abovementioned homopolymers and copolymers, in particular vinyl chloride homopolymers, with other thermoplastic and/or elastomeric polymers, in particular blends with ABS, MBS, NBR, SAN, EVA, CPE, MBAS, PMA, PMMA, EPDM and polylactones.

Also preferred are suspension, bulk and emulsion polymers.

The particularly preferred chlorine-containing polymer is polyvinyl chloride, in particular suspension or bulk polyvinyl chloride.

For the purposes of this invention, (a) PVC is also taken to mean copolymers or graft polymers of PVC with polymerizable compounds, such as acrylonitrile, vinyl acetate or ABS, it being possible for these to be suspension, bulk or emulsion polymers. Preference is given to PVC homopolymer, also in combination with polyacrylates.

For the purposes of the present invention, (a) is also taken to mean, in particular, recyclates of halogen-containing polymers, these being the above-described polymers which have experienced damage due to processing, use or storage. Particular preference is given to PVC recyclate. The recyclates can also contain small amounts of foreign substances, for example paper, pigments and adhesives, which are frequently difficult to remove. These foreign substances can also originate from contact with diverse substances during use or treatment, for example fuel residues, paint remnants, metal traces, initiator residues or water traces.

The di- or polysaccharide alcohols which can be used according to the invention as component (b) are generally known. Particular preference is given to disaccharide alcohols, for example maltitol, malbitol, lactitol, palatinitol, isomaltitol, isomaltol, leucrose, dihydroleucrose, glucopyranosylsorbitol, glucopyranosylmannitol and lycasine (dehydrated). Very particular preference is given to maltitol, lactitol, isomaltitol and palatinitol.

The di- or polysaccharide alcohol which can be used according to the invention as component (b) can be used in an amount of, for example, from 0.01 to 10 parts by weight, expediently from 0.01 to 5 parts by weight, particularly preferably from 0.01 to 3 parts by weight, based on 100 pans by weight of halogen-containing polymer.

Preference is given to a stabilized halogen-containing polymer, as described above, in which (c) is at least one inorganic zinc compound, for example zinc oxide, hydroxide, chloride or sulfide, or superbasic zinc oxide/hydroxide addition compounds, or an organic zinc compound from the series consisting of aliphatic, saturated $C_2$–$C_{22}$carboxylates, aliphatic, unsaturated $C_3$–$C_{22}$carboxylates, aliphatic $C_2$–$C_{22}$carboxylates which are substituted by at least one OH group or whose chain is interrupted by at least one O atom (oxa acids), cyclic and bicyclic carboxylates having 5–22 carbon atoms, phenyl carboxylates which are unsubstituted, are substituted by at least one OH group and/or are $C_1$–$C_{16}$alkyl-substituted, naphthyl carboxylates which are unsubstituted, are substituted by at least one OH group and/or are $C_1-C_{16}$alkyl-substituted, phenyl-$C_1-C_{16}$alkyl carboxylates, naphthyl-$C_1-C_{16}$alkyl carboxylates, or unsubstituted or $C_1-C_{12}$alkyl-substituted phenolates.

Examples which may be mentioned by name are the zinc salts of monovalent carboxylic acids, such as acetic acid, propionic acid, butyric acid, valetic acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, isostearic acid, stearic acid, 12-hydroxystearic acid, 9,10-dihydroxystearic acid, 3,6-dioxaheptanoic acid, 3,6,9-trioxadecanoic acid, behenic acid, benzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, and sorbic acid; zinc salts of monoesters of divalent carboxylic acids, such as oxalic acid, malonic acid, succinic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, 3,6,9-trioxadecane- 1,10-dicarboxylic acid, polyglycoldicarboxylic acid (n=10–12), phthalic acid, isophthalic acid, terephthalic acid and hydroxyphthalic acid; and diesters or triesters of trivalent or tetravalent carboxylic acids, such as hemimellitic acid, trimellitic acid, pyromellitic acid and citric acid, and zinc salts of mono- and diesterified phosphoric acid or of monoesterified phosphorous acid, as described in JP 3 275 570.

Preference is given to compositions as described above in which (c) is an organic zinc compound, in particular an organic zinc carboxylate of a carboxylic acid having 7 to 18 carbon atoms (zinc soaps), for example benzoates or alkanoates, preferably stearate, oleate, laurate, palmitate, behenate, hydroxystearates, dihydroxystearates or (iso)octanoate. Particular preference is given to stearate, oleate, benzoate and 2-ethylhexanoate.

In addition to said zinc compounds, component (c) can also be inorganic or organic aluminium compounds, to which the abovesaid relating to the zinc compounds also applies. Further information on the preferred aluminium compounds which can be used is given in U.S. Pat. No. 4 060 512.

In addition to said zinc compounds, component (c) can also be inorganic or organic rare-earth compounds, to which the abovesaid regarding the zinc compounds also applies. The term rare-earth compounds is taken to mean, in particular, compounds of the elements cerium, praseodymium, neodymium, samarium, europium, gadolinium, terbium, dysprosium, holmium, erbium, thulium, ytterbium, lutetium, lanthanum and yttrium, preference being given to mixtures, in particular with cerium. Further preferred rare-earth compounds are given in EP-A 0 108 023.

It it also possible to employ a mixture of zinc, aluminium, lanthanum or lanthanoid compounds of different structures. Organic zinc, aluminium, lanthanum or lanthanoid compounds can also be coated onto a hydrotalcite, zeolite or dawsonite, cf. DE-A 4 031 818.

The inorganic or preferably organic zinc, aluminium or rare-earth compound can be used in an amount of, for example, from 0.001 to 5 parts by weight, expediently from 0.01 to 3 parts by weight, particularly preferably from 0.1 to 2 parts by weight, based on 100 parts by weight of halogen-containing polymer.

The PVC stabilized in accordance with the invention may contain further additives. These are, for example, inorganic or organic calcium or magnesium compounds, zeolites, hydrotalcites, dawsonites, magadiites, kenyaites, kanemites, 1,3-diketo compounds, polyols, N-containing compounds, for example β-aminocrotonates, as mentioned in EP 0 465 405, p. 6, lines 9–14, α-phenylindole, pyrroles, sterically hindered amines (HALS), dihydropyridines and polymers thereof, perchlorates, epoxides, phenolic antioxidants (HANDBOOK OF PVC FORMULATING, E. J. Wickson, John Wiley & Sons, Inc., 1993, pp. 505–515), naphthols, thiophosphates, plasticizers (HANDBOOK OF PVC FORMULATING, E. J. Wickson, John Wiley & Sons, Inc., 1993, pp. 163–303), fillers (HANDBOOK OF PVC FORMULATING, E. J. Wickson, John Wiley & Sons, Inc., 1993, pp. 393–449) and reinforcing agents (TASCHENBUCH DER KUNSTSTOFF-ADDITIVE, R. Gächter & H. Müller, Carl Hanser, 1990, pp. 549–615) (for example calcium carbonate, magnesium oxide, magnesium hydroxide, silicates, glass fibres, talc, kaolin, chalk, mica, metal oxides and hydroxides, carbon black or graphite), phosphites, chelators (TASCHENBUCH DER KUNSTSTOFF-ADDITIVE, R. Gächter & H. Müller, Carl Hanser, 1990, pp. 109–131), light stabilizers, UV absorbers (HANDBOOK OF PVC FORMULATING, E. J. Wickson, John Wiley & Sons, Inc., 1993, pp. 355–369), lubricants (HANDBOOK OF PVC FORMULATING, E. J. Wickson, John Wiley & Sons, Inc., 1993, pp. 369–393), impact modifiers (IMPACT MODIFIERS FOR PVC, J. T. Lutz & D. L. Dunkelberger, John Wiley & Sons, Inc., 1992) and processing auxiliaries (TASCHENBUCH DER KUNSTSTOFF-ADDITIVE, R. Gächter & H. Müller, Carl Hanser, 1990, pp. 505–524), fatty acid esters, paraffins, blowing agents (HANDBOOK OF PVC FORMULATING, E. J. Wickson, John Wiley & Sons, Inc., 1993, pp. 525–551), optical brighteners (TASCHENBUCH DER KUNSTSTOFF-ADDITIVE, R. Gächter & H. Müller, Carl Hanser, 1990, pp. 807–821), gelling auxiliaries, dyes (HANDBOOK OF PVC FORMULATING, E. J. Wickson, John Wiley & Sons, Inc., 1993, pp. 449–475), pigments (TASCHENBUCH DER KUNSTSTOFF-ADDITIVE, R. Gächter & H. Müller, Carl Hanser, 1990, pp. 663–735), flameproofing agents and smoke-reducing agents (HANDBOOK OF PVC FORMULATING, E. J. Wickson, John Wiley & Sons, Inc., 1993, pp. 551–579), antistatics (HANDBOOK OF PVC FORMULATING, E. J. Wickson, John Wiley & Sons, Inc., 1993, pp. 487–505), antifogging agents (HANDBOOK OF PVC FORMULATING, E. J. Wickson, John Wiley & Sons, Inc., 1993, pp. 475–487), biocides, thiodipropionic acid and esters thereof, dialkyl disulfides (HANDBOOK OF PVC FORMULATING, E. J. Wickson, John Wiley & Sons, Inc., 1993, pp. 515–525), mercaptocarboxylic acid esters, peroxide scavengers, modifiers and other complexing agents for Lewis acids.

Suitable inorganic or organic calcium and magnesium compounds are the analogous compounds mentioned under zinc compounds. Preference is given to organic calcium or magnesium compounds, in particular calcium or magnesium soaps, and calcium oxide, calcium hydroxide and superbasic calcium compounds, as described, for example, in EP 0 446 685, 0 394 547 and 0 279 493.

In addition to components (b) and (c) of this invention, it is also possible to employ epoxy compounds, such as 1,2-epoxides and oxiranes, in amounts of, for example, up to 10 parts by weight, expediently up to 5 parts by weight, preferably from 0.01 to 2 parts by weight, based on 100 parts by weight of the composition. Examples thereof are epoxidized polybutadiene, epoxidized soybean oil, epoxidized linseed oil, epoxidized fish oil, epoxidized tallow, methylbutyl or 2-ethylhexyl epoxystearate, tris(epoxypropyl)isocyanurate, epoxidized castor oil, epoxidized sunflower oil, 3-(2-phenoxy)-1,2-epoxypropane, bisphenol A polyglycidyl ether, vinylcyclohexene diepoxide, dicyclopentadiene diepoxide and 3,4-epoxycyclohexylmethyl 3,4-epoxycyclohexanecarboxylate.

The other epoxide compounds which can be used for the purposes of the invention can have an aliphatic, aromatic, cycloaliphatic, araliphatic or heterocyclic structure; they contain epoxide groups as side groups. The epoxide groups are preferably bonded to the remainder of the molecule as glycidyl groups via ether or ester bonds, or they are N-glycidyl derivatives of heterocyclic amines, amides or imides. Epoxide compounds of these types are known in general terms and are commercially available.

The epoxide compounds contain at least one epoxy radical, in particular of the formula II

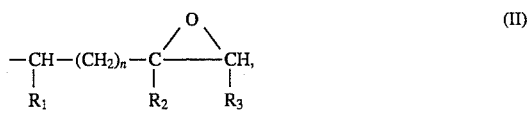

which is bonded directly to carbon, oxygen, nitrogen or sulfur atoms, where $R_1$ and $R_3$ are both hydrogen, $R_2$ is hydrogen or methyl, and n is 0, or in which $R_1$ and $R_3$ together are —$CH_2$—$CH_2$— or —$CH_2$—$CH_2$—$CH_2$—, $R_2$ is then hydrogen, and n is 0 or 1.

Examples which may be mentioned of epoxide compounds are:

I) Glycidyl and β-methylglycidyl esters obtainable by reacting a compound containing at least one carboxyl group in the molecule and epichlorohydrin or glycerol dichlorohydrin or β-methylepichlorohydrin. The reaction is preferably carried out in the presence of bases.

The compounds containing at least one carboxyl group in the molecule can be aliphatic carboxylic acids. Examples of these carboxylic acids are glutaric acid, adipic acid, pimelic acid, suberic acid, azelaic acid, sebacic acid or dimerized or trimerized linoleic acid, acrylic acid, methacrylic acid, caproic acid, caprylic acid, lauric acid, myristic acid, palmitic acid, stearic acid and pelargonic acid, and the acids mentioned in the case of the organic zinc compounds.

However, it is also possible to employ cycloaliphatic carboxylic acids, for example cyclohexanecarboxylic acid, tetrahydrophthalic acid, 4-methyltetrahydrophthalic acid, hexahydrophthalic acid or 4-methylhexahydrophthalic acid.

It is also possible to use aromatic carboxylic acids, for example benzoic acid, phthalic acid, isophthalic acid, trimellitic acid or pyromellitic acid.

It is likewise possible to use carboxyl-terminated adducts, for example of trimellitic acid and polyols, for example glycerol or 2,2-bis(4-hydroxycyclohexyl)propane.

Other epoxide compounds which can be used for the purposes of the present invention are given in EP 0 506 617.

II) Glycidyl or β-methylglycidyl ethers obtainable by reacting a compound containing at least one free alcoholic hydroxyl group and/or phenolic hydroxyl group and a suitably substituted epichlorohydrin under alkaline conditions, or in the presence of an acid catalyst followed by alkali treatment.

Ethers of this type are derived, for example, from acyclic alcohols, such as ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins, butanol, amyl alcohol, pentanol and from monofunctional alcohols such as isooctanol, 2-ethylhexanol, isodecanol and $C_7$–$C_9$ alkanol and $C_9$–$C_{11}$ alkanol mixtures.

However, they are also derived, for example, from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they contain aromatic rings, such as N,N-bis(2-hydroxyethyl)aniline or p,p'-bis(2-hydroxyethylamino)diphenylmethane.

The epoxide compounds can also be derived from monocyclic phenols, for example from phenol, resorcinol or hydroquinone; or they are based on polycyclic phenols, for example on bis(4-hydroxyphenyl)methane, 2,2-bis(4-hydroxyphenyl)propane, 2,2-bis(3,5-dibromo-4-hydroxyphenyl)propane, 4,4'-dihydroxydiphenyl sulfone or on condensation products of phenols with formaldehyde obtained under acid conditions, such as phenol novolaks.

Examples of other possible terminal epoxides are: glycidyl 1-naphthyl ether, glycidyl 2-phenylphenyl ether, 2-biphenyl glycidyl ether, N-(2,3-epoxypropyl)phthalimide and 2,3-epoxypropyl 4-methoxyphenyl ether.

III) N-Glycidyl compounds obtainable by dehydrochlorinating the products of the reaction of epichlorohydrin with amines, which contain at least one amino hydrogen atom. These amines are, for example, aniline, N-methylaniline, toluidine, n-butylamine, bis(4-aminophenyl)methane, m-xylylenediamine or bis(4-methylaminophenyl)methane, but also N,N,O-triglycidyl-m-aminophenol or N,N,O-triglycidyl-p-aminophenol.

However, the N-glycidyl compounds also include N,N'-di-, N,N',N''-tri- and N,N',N'',N'''-tetraglycidyl derivatives of cycloalkyleneureas, such as ethyleneurea or 1,3-propyleneurea, and N,N'-diglycidyl derivatives of hydantoins, such as of 5,5-dimethylhydantoin or glycol uril and triglycidyl isocyanurate.

IV) S-Glycidyl compounds, for example di-S-glycidyl derivatives derived from dithiols, for example ethane-1,2-dithiol or bis(4-mercaptomethylphenyl) ether.

V) Epoxide compounds containing a radical of the formula II in which $R_1$ and $R_3$ together are —$CH_2$—$CH_2$—, and n is 0, are bis(2,3-epoxycyclopentyl) ether, 2,3-epoxycyclopentyl glycidyl ether or 1,2-bis(2,3-epoxycyclopentoxy)ethane. An epoxide compound containing a radical of the formula II in which $R_1$ and $R_3$ together are —$CH_2$—$CH_2$— and n is 1 is for example (3'4'-epoxy-6'-methylcyclohexyl)methyl 3,4-epoxy-6-methylcyclohexanecarboxylate.

Examples of suitable terminal epoxides are:

a) liquid bisphenol A diglycidyl ethers, such as Araldit®GY 240, Araldit®GY 250, Araldit®GY 260, Araldit®GY 266, Araldit®GY 2600, Araldit®MY 790;

b) solid bisphenol A diglycidyl ethers, such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610;

c) liquid bisphenol F diglycidyl ethers, such as Araldit®GY 281, Araldit®PY 302, Araldit®PY 306;

d) solid polyglycidyl ethers of tetraphenylethane, such as CG Epoxy Resin®0163;

e) solid and liquid polyglycidyl ethers of phenol-formaldehyde novolak, such as EPN 1138, EPN 1139, GY 1180, PY 307;

f) solid and liquid polyglycidyl ethers of o-cresol-formaldehyde novolak, such as ECN 1235, ECN 1273, ECN 1280, ECN 1299;

g) liquid glycidyl ethers of alcohols, such as Shell®glycidyl ether 162, Araldit®DY 0390, Araldit®DY 0391;

h) liquid glycidyl ethers of carboxylic acids, such as Shell®Cardura E terephthalates, trimellitates, Araldit®PY 284;

i) solid heterocyclic epoxy resins (triglycidyl isocyanurates), such as Araldit®PT 810;

j) liquid cycloaliphatic epoxy resins, such as Araldit®CY 179;

k) liquid N,N,O-triglycidyl ether of p-aminophenol, such as Araldit®MY 0510;

l) tetraglycidyl-4,4'-methylenebenzamine or N,N,N',N'-tetraglycidyldiaminophenylmethane, such as Araldit®MY 720, Araldit®MY 721.

Preference is given to epoxide compounds containing two functional groups. However, it is in principle possible for epoxide compounds containing one, three or more functional groups to be used.

Predominantly employed are diglycidyl compounds, having aromatic structures, for example phenyl radicals.

If desired, a mixture of epoxide compounds of different structures can also be employed.

Particularly preferred polyfunctional epoxide compounds are diglycidyl ethers based on bisphenols, for example on 2,2-bis(4-hydroxyphenyl)propane (bisphenol A), bis(4-hydroxyphenyl)methane or mixtures of bis(ortho/para-hydroxyphenyl)methane (bisphenol F).

1,3-Diketo compounds which can be used can be linear or cyclic dicarbonyl compounds. Preference is given to diketo compounds of the formula (III)

(III)

in which $R_1$ is $C_1$–$C_{22}$alkyl, $C_5$–$C_{10}$hydroxyalkyl, $C_2$–$C_{18}$alkenyl, phenyl, phenyl which is substituted by OH, $C_1$–$C_4$alkyl, $C_1$–$C_4$alkoxy or halogen, $C_7$–$C_{10}$phenylalkyl, $C_5$–$C_{12}$cycloalkyl, $C_5$–$C_{12}$cycloalkyl which is substituted by $C_1$–$C_4$alkyl, or an —$R_5$—S—$R_6$ or —$R_5$—O—$R_6$ group, $R_2$ is hydrogen, $C_1$–$C_8$alkyl, $C_2$–$C_{12}$alkenyl, phenyl, $C_7$–$C_{12}$alkylphenyl, $C_7$–$C_{10}$phenylalkyl or a —CO—$R_4$ group, $R_3$ has one of the meanings given for $R_1$ or is $C_1$–$C_{18}$alkoxy, $R_4$ is $C_1$–$C_4$alkyl or phenyl, $R_5$ is $C_1$–$C_{10}$alkylene, and $R_6$ is $C_1$–$C_{12}$alkyl, phenyl, $C_7$–$C_{18}$alkylphenyl or $C_7$–$C_{10}$phenylalkyl.

These include the hydroxyl-containing diketones of EP-A 346 279 and the oxa- and thiadiketones of EP-A 307 358.

Alkyl $R_1$ and $R_3$ can be, in particular, $C_1$–$C_{18}$alkyl, for example methyl, ethyl, n-propyl, isopropyl, n-butyl, tert-butyl, pentyl, hexyl, heptyl, octyl, decyl, dodecyl or octadecyl. Hydroxyalkyl $R_1$ and $R_3$ are, in particular, a —$(CH_2)_n$—OH group, in which n is 5, 6 or 7.

Alkenyl $R_1$ and $R_3$ can be, for example, vinyl, allyl, methallyl, 1-butenyl, 1-hexenyl or oleyl, preferably allyl.

OH—, alkyl-, alkoxy- or halogen-substituted phenyl $R_1$ and $R_3$ can be, for example, tolyl, xylyl, tert-butylphenyl, methoxyphenyl, ethoxyphenyl, hydroxyphenyl, chlorophenyl or dichlorophenyl.

Phenylalkyl $R_1$ and $R_3$ are, in particular, benzyl. Cycloalkyl or alkylcycloalkyl $R_1$ and $R_3$ are, in particular, cyclohexyl or methylcyclohexyl.

Alkyl $R_2$ can be, in particular, $C_1$–$C_4$alkyl. $C_2$–$C_{12}$alkenyl $R_2$ can be, in particular, allyl. Alkylphenyl $R_2$ can be, in particular, tolyl. Phenylalkyl $R_2$ can be, in particular, benzyl. $R_2$ is preferably hydrogen. Alkoxy $R_3$ can be, for example, methoxy, ethoxy, butoxy, hexyloxy, octyloxy, dodecyloxy, tridecyloxy, tetradecyloxy or octadecyloxy. $C_1$–$C_{10}$alkylene $R_5$ is, in particular, $C_2$–$C_4$alkylene. Alkyl $R_6$ is, in particular, $C_4$–$C_{12}$alkyl, for example butyl, hexyl, octyl, decyl or dodecyl. Alkylphenyl $R_6$ is, in particular, tolyl. Phenylalkyl $R_6$ is, in particular, benzyl.

Examples of 1,3-dicarbonyl compounds of the formula (III) are acetylacetone, acetylcyclopentanone, benzoylcyclopentanone, acetylbutyrolactone, benzoylbutyrolactone, butanoylacetone, heptanoylacetone, stearoylacetone, palmitoylacetone, lauroylacetone, 7-tert-nonylthioheptane-2,4-dione, benzoylacetone, dibenzoylmethane, lauroylbenzoylmethane, palmitoylbenzoylmethane, stearoylbenzoylmethane, 5-hydroxycaproylbenzoylmethane, tribenzoylmethane, bis(4-methylbenzoyl)methane, benzoyl-p-chlorobenzoylmethane, bis (2-hydroxybenzoyl)methane, 4-methoxybenzoylbenzoylmethane, bis(4-methoxybenzoyl)methane, 1-benzoyl- 1-acetylnonane, benzoylacetylphenylmethane, stearoyl-4-methoxybenzoylmethane, bis(4-tert-butylbenzoyl)methane, benzoylformylmethane, benzoylphenylacetylmethane, bis(cyclohexanoyl)methane, di(pivaloyl)methane, methyl, ethyl, hexyl, octyl, dodecyl or octadecyl acetoacetate, ethyl, butyl, 2-ethylhexyl, dodecyl or octadecyl benzoylacetate, ethyl, propyl, butyl, hexyl or octyl stearoyl acetate and dehydracetic acid, and the magnesium, calcium, zinc or aluminium salts thereof.

Preference is given to 1,3-diketo compounds of the formula (III) in which $R_1$ is $C_1$–$C_{18}$alkyl, phenyl, phenyl which is substituted by OH, methyl or methoxy, $C_7$–$C_{10}$phenylalkyl or cyclohexyl, $R_2$ is hydrogen, and $R_3$ has one of the meanings given for $R_1$.

Particular preference is given to magnesium acetylacetonate, calcium acetylacetonate, zinc acetylacetonate, aluminium acetylacetonate, stearoylbenzoylmethane, dibenzoylmethane, benzoyloctanoylmethane and the trisacetoacetic ester of trisethylisocyanurate, as described in U.S. Pat. No. 4,339,383. A review of 1,3-diketo compounds is given in EP 6318, EP 0 046 161, EP 0 035 268 and EP 0 040 286.

The 1,3-diketo compounds can be used in an amount of, for example, from 0.01 to 10 parts by weight, preferably from 0.01 to 2 parts by weight, in particular from 0.05 to 1 part by weight, based on 100 parts by weight of PVC.

Other possible stabilizers which can be used in addition are 1,3-ketoesters of the formula (IV)

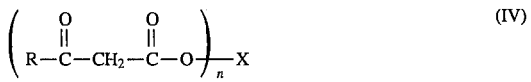

(IV)

in which n is 1, 2, 3, 4 or 6 and, if n=1, R is phenyl and X is an alkyl group having 10 to 20 carbon atoms, if n=2, R is alkyl having 1 to 4 carbon atoms or phenyl, and X is alkylene having 4 to 12 carbon atoms, alkylene having 2 to 12 carbon atoms which is substituted by at least one $C_1$–$C_8$alkyl group, —$CH_2$—$CH_2$—S—$CH_2$—$CH_2$—S—$CH_2$ —$CH_2$— or —$CH_2$—$CH_2$—S—$CH_2$—$CH_2$—, if n=3, R is alkyl having 1 to 4 carbon atoms or phenyl, and X is $CH_3CH_2C(CH_2$—$)_3$, if n=4, R is alkyl having 1 to 4 carbon atoms or phenyl, and X is

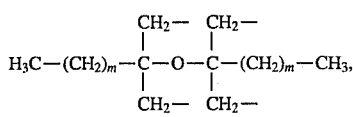

in which m is 0 or 1, and if n=6, R is alkyl having 1 to 4 carbon atoms or phenyl, and X is

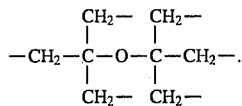

R as alkyl having 1 to 4 carbon atoms is, for example, methyl, ethyl, propyl or butyl.

X as alkyl having 10 to 20 carbon atoms may be straight-chain or branched and is, for example, n-decyl, n-dodecyl or n-octadecyl.

X as $C_4$–$C_{12}$alkylene or as $C_2$–$C_{12}$alkylene which is substituted by at least one $C_1$–$C_8$alkyl group is, for example, 1,2-di-tert-butyldimethylene, tetramethylene, hexamethylene, 2,2-dimethyltrimethylene, 2-ethyl-2-butyltrimethylene, 2-methyl-2-propyltrimethylene, octamethylene, nonamethylene, decamethylene or dodecamethylene.

The variable n is preferably 1, 2 or 3, as described in EP 0 433 230.

Other possible stabilizers which can be used in addition are compounds of the formula (V)

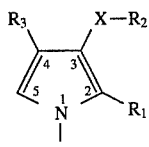

in which X is

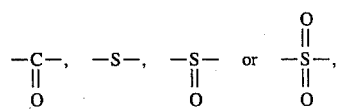

$R_1$ and $R_2$, independently of one another, are $C_1$–$C_{20}$alkyl, hydroxy- and/or halogen-substituted $C_1$–$C_{10}$alkyl, $C_3$–$C_{20}$alkenyl, $C_5$–$C_{12}$cycloalkyl, $C_1$–$C_4$ alkyl-substituted $C_5$–$C_8$cycloalkyl, phenyl or phenyl which is monosubstituted to trisubstituted by $A_1$, where the radicals $A_1$ are, independently of one another, $C_1$–$C_{10}$alkyl, halogen, hydroxyl, methoxy or ethoxy, $R_1$ and $R_2$ are furthermore $C_7$–$C_{10}$phenylalkyl which is unsubstituted or monosubstituted to trisubstituted on the phenyl ring by $A_2$, where the radicals $A_2$ are, independently of one another, $C_1$–$C_{20}$alkyl, halogen, hydroxyl, methoxy or ethoxy, and $R_3$ is phenyl or phenyl which is monosubstituted to trisubstituted by $A_3$, where the radicals $A_3$ are, independently of one another, $C_1$–$C_{10}$alkyl, halogen, hydroxyl, methoxy, ethoxy or ($C_1$–$C_8$alkyl)oxycarbonyl, with the provisos that at least one of the radicals $R_1$ and $R_2$ is phenyl or phenyl substituted as defined, and $R_1$ is not methyl if $R_2$ is phenyl.

The compounds of the above formula have a very good stabilizing action against both thermal and light-induced degradation. The long-term stabilizing action against thermal degradation is particularly noteworthy.

$R_1$ is preferably not $C_1$–$C_3$alkyl, in particular $C_1$–$C_{20}$alkyl, if $R_2$ is phenyl.

Halogen is preferably chlorine.

Alkyl having up to 20 carbon atoms is, for example, methyl, ethyl, propyl, butyl, t-butyl, pentyl, hexyl, heptyl, octyl, i-octyl, i-nonyl, decyl, dodecyl or octadecyl.

Hydroxy- and/or halogen-substituted $C_1$–$C_{10}$alkyl is, for example, 5-hydroxypentyl, 2,3,5-trihydroxypentyl or 5-chloropentyl.

$C_3$–$C_{20}$alkenyl is, for example, allyl, 2-methallyl, 3-methylbut-2-enyl, 3-methylbut-3-enyl, hexenyl, decenyl, undecenyl, heptadecenyl or oleyl. Preference is given to allyl, methallyl and oleyl.

$C_5$–$C_{12}$cycloalkyl is, for example, cyclopentyl, cyclohexyl, cycloheptyl, cyclooctyl, cyclodecyl or cyclododecyl. $C_5$–$C_7$Cycloalkyl, in particular cyclohexyl, is preferred.

$C_5$–$C_8$cycloalkyl which is substituted by $C_1$–$C_4$alkyl, in particular methyl, is, for example, methylcyclohexyl or tert-butylcyclohexyl.

Examples of phenyl which is monosubstituted to trisubstituted by radicals as defined are o-, m- and p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 2-methyl-4-tert-butylphenyl, 2-ethylphenyl, 2,6-diethylphenyl, 2,6-diethyl-4-methylphenyl, 2,6-diisopropylphenyl, 4-tert-butylphenyl, p-nonylphenyl, o-, m- and p-chlorophenyl, 2,3-dichlorophenyl, 2,4-dichlorophenyl, 2,5-dichlorophenyl, 2,6-dichlorophenyl, 3,4-dichlorophenyl, 2,4,5-trichlorophenyl, 2,4,6-trichlorophenyl, o-, m- and p-hydroxyphenyl, o-, m- and p-methoxyphenyl, o- and p-ethoxyphenyl, 2,4-dimethoxyphenyl, 2,5-dimethoxyphenyl, 2,5-diethoxyphenyl, o-, m- and p-methoxycarbonyl, 2-chloro-6-methylphenyl, 3-chloro-2-methylphenyl, 3-chloro-4-methylphenyl, 4-chloro-2-methylphenyl, 5-chloro-2-methylphenyl, 2,6-dichloro-3-methylphenyl, 2-hydroxy-4-methylphenyl, 3-hydroxy-4-methylphenyl, 2-methoxy-5-methylphenyl, 4-methoxy-2-methylphenyl, 3-chloro-4-methoxyphenyl, 3-chloro-6-methoxyphenyl, 3-chloro-4,6-dimethoxyphenyl and 4-chloro-2,5-dimethoxyphenyl.

$C_7$–$C_{10}$Phenylalkyl is, for example, benzyl or 2-phenylethyl. Benzyl is preferred. If the phenyl group in these radicals is monosubstituted to trisubstituted by groups as defined, it can be as defined above. $C_7$–$C_{10}$Phenylalkyl which is substituted on the phenyl group by $C_1$–$C_{20}$alkyl, preferably $C_8$–$C_{14}$alkyl, is as defined above. A further example which may be mentioned is dodecylbenzyl. A more precise list is given in EP 0 465 405.

Other possible stabilizers which can be used in addition are pyrroles of the formula (VI)

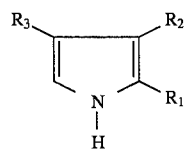

in which $R_1$ is hydrogen, alkyl, cycloalkyl, aryl, alkoxycarbonylmethyl, α-hydroxyalkyl, esterified α-hydroxyalkyl, α-hydroxycycloalkylmethyl, esterified α-hydroxycycloalkylmethyl, α-hydroxyaralkyl, esterified α-hydroxyaralkyl, alkoxymethyl, alkylthiomethyl, aryloxymethyl, arylthiomethyl, cycloalkoxymethyl, cycloalkylthiomethyl, aralkoxymethyl, aralkylthiomethyl, alkoxy, alkylthio, cycloalkoxy, cycloalkylthio, aralkoxy, arylalkylthio, aryloxy, arylthio, halogen, mercapto, mercaptomethyl or hydroxyl, $R_2$ is hydrogen, alkyl, cycloalkyl, aryl, α-hydroxyalkyl, esterified α-hydroxyalkyl, the alkyl moiety of which, together with $R_1$, can be alkylene, α-hydroxycycloalkylmethyl, esterified α-hydroxycycloalkylmethyl, α-hydroxyaralkyl, esterified α-hydroxyaralkyl, alkoxy, cycloalkyloxy, aralkoxy, aryloxy, alkylthio, cycloalkylthio, aralkylthio, arylthio, alkoxymethyl, alkylthiomethyl, aryloxymethyl, arylthiomethyl, cycloalkoxymethyl, cycloalkylthiomethyl, aralkoxymethyl, arylalkylthiomethyl, hydroxyl, cyano, carboxyl, salted, esterified or amidated carboxyl or acyl, where acyl, together with $R_1$, can be —CO—alkylene, in which —CO— is bonded in the 3-position, or halogen, mercapto or mercaptomethyl, and $R_3$ is alkyl, cycloalkyl, aralkyl, aryl, hydroxymethyl, esterified hydroxymethyl, alkoxymethyl, alkylthiomethyl, cycloalkoxymethyl, cycloalkylthiomethyl, aralkoxymethyl, arylalkylthiomethyl, aryloxymethyl or arylthiomethyl, alkoxy, alkylthio, cycloalkoxy, cycloalkylthio, aralkoxy, aralkylthio, aryloxy, arylthio, halogen, mercapto or mercaptomethyl, or, if $R_2$ is salted carboxyl, $R_3$ is hydrogen and $R_1$ is as defined above, or in which $R_3$ is hydroxyl, and $R_1$ is hydrogen, alkyl or aryl, and $R_2$ is hydrogen, alkyl, aryl or acyl, or a salt thereof. A list of these is given in EP 0 022 087.

Other possible stabilizers which can be used in addition are compounds of the formula (VII)

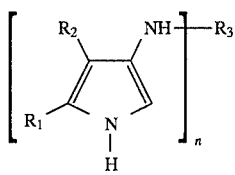

(VII)

in which n is 1 or 2, $R_1$ is $C_1$–$C_4$alkyl, $R_2$ is a group of the formula IIa, IIb, IIc or IId

  (IIa)

  (IIb)

  (IIc)

  (IId)

$X_1$ is hydrogen, $C_1$–$C_{20}$alkyl, $C_3$–$C_6$alkyl which is interrupted by one or two oxygen atoms or sulfur atoms and/or is substituted by OH, $C_3$–$C_{20}$alkenyl, $C_5$–$C_{12}$cycloalkyl, $C_1$–$C_4$alkyl-substituted $C_5$–$C_{12}$cycloalkyl, phenyl, $C_1$–$C_{10}$alkyl—, chlorine-, hydroxyl-, methoxy- and/or ethoxy-substituted phenyl, $C_7$–$C_{10}$phenylalkyl or $C_7$–$C_{10}$phenylalkyl which is substituted on the phenyl radical by $C_1$–$C_{20}$alkyl, chlorine, hydroxyl, methoxy and/or ethoxy, $X_2$ is phenyl which is unsubstituted or monosubstituted to trisubstituted, where the substituents are selected from the group consisting of $C_1$–$C_4$alkyl, chlorine, hydroxyl, methoxy, ethoxy and acetylamino, $X_3$ is $C_1$–$C_8$alkyl or phenyl, $R_3$, if n is 1, is a group of the formulae IIIa to IIIg

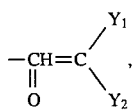  (IIIa)

  (IIIb)

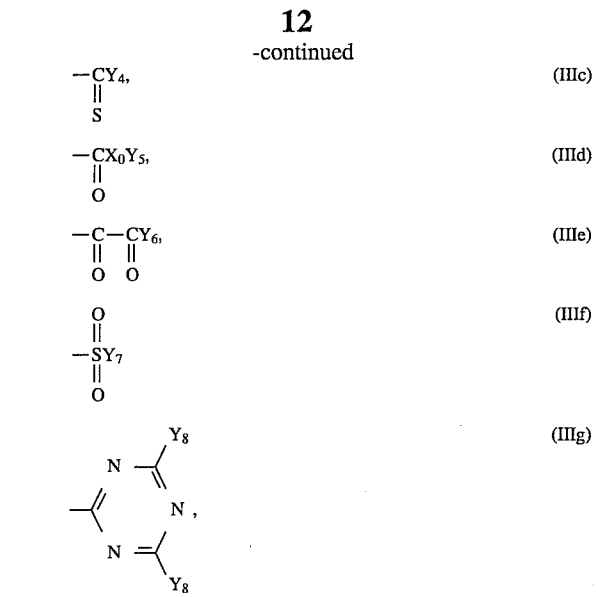

$X_0$ is an oxygen or sulfur atom, $Y_1$ and $Y_2$, independently of one another, are —CN, benzoyl, $C_2$–$C_4$alkanoyl or $C_2$–$C_4$alkoxycarbonyl, $Y_3$ is $C_1$–$C_{20}$alkyl, $C_3$–$C_{20}$alkenyl, phenyl, $C_1$–$C_4$alkyl-, chlorine-, $NO_2$—, methoxy- and/or ethoxy-substituted phenyl, 2-phenylethenyl, di($C_1$–$C_4$alkyl)amino, diphenylamino, $C_1$–$C_{20}$alkylamino, $C_3$–$C_8$cycloalkylamino, phenylamino, phenylamino which is substituted on the phenyl ring by $C_1$–$C_4$alkyl, chlorine, hydroxyl, methoxy and/or ethoxy, benzylamino, benzenesulfonamido or toluenesulfonamido, $Y_4$ is di($C_1$–$C_4$alkyl)amino, diphenylamino, $C_1$–$C_8$alkylamino, phenylamino, phenylamino which is substituted on the phenyl ring by $C_1$–$C_4$alkyl, chlorine, hydroxyl, methoxy and/or ethoxy, or benzylamino, $Y_5$ is $C_1$–$C_{20}$alkyl, $C_3$–$C_6$alkyl which is interrupted by one or two oxygen atoms, $C_5$–$C_{12}$cycloalkyl, $C_1$–$C_4$alkyl-substituted $C_5$–$C_{12}$cycloalkyl, phenyl, $C_7$–$C_{10}$ phenylalkyl or $C_7$–$C_{10}$phenylalkyl which is substituted on the phenyl radical by $C_1$–$C_{20}$alkyl, $Y_6$ is $C_1$–$C_4$alkoxy, phenylamino or phenylamino which is substituted on the phenyl group by $C_1$–$C_4$alkyl, chlorine, hydroxyl, methoxy and/or ethoxy, $Y_7$ is $C_1$–$C_4$alkyl, phenyl or $C_1$–$C_4$alkyl-, chlorine-, —$NO_2$—, ($C_1$–$C_{12}$alkyl)oxycarbonyl- and/or phenoxycarbonyl-substituted phenyl, the radicals $Y_8$, independently of one another, are $C_1$–$C_4$alkoxy or allyloxy, and, if n is 2, $R_3$ is a group of the formula IVa, IVb, IVc or IVd

  (IVa)

  (IVb)

  (IVd)

  (IVd)

$X_0$ is as defined above, $Z_1$ is a direct bond, $C_1$–$C_{12}$alkylene or phenylene, $Z_2$ is $C_2$–$C_{12}$alkylene or 3-oxapentylene, $Z_3$ is $C_4$–$C_8$alkylene or phenylene, and $Z_4$ is $C_1$–$C_4$alkoxy or allyloxy.

$C_1$–$C_{20}$alkyl is, for example, methyl, ethyl, propyl, butyl, t-butyl, pentyl, hexyl, heptyl, octyl, i-octyl, i-nonyl, decyl, dodecyl or octadecyl.

$R_1$ is preferably straight-chain $C_1$–$C_4$alkyl, in particular methyl.

A preferred meaning of $X_1$ is $C_1$–$C_{18}$alkyl, in particular $C_1$–$C_{12}$alkyl, for example methyl or ethyl.

Alkyl $X_3$ is preferably methyl or ethyl, in particular methyl.

Alkyl $Y_5$ preferably has 1 to 4 carbon atoms. Methyl and ethyl are particularly preferred meanings of $Y_5$.

$C_1$–$C_4$alkoxy is, for example, methoxy, ethoxy, propoxy or butoxy.

$C_3$–$C_6$alkyl which is interrupted by 1 or 2 oxygen atoms is, for example, 3-oxabutyl, 3-oxapentyl, 3-oxaheptyl, 3,6-dioxaheptyl or 3,6-dioxaoctyl. $C_3$–$C_6$alkyl which is interrupted by 1 or 2 oxygen atoms or sulfur atoms and/or is substituted by OH can be, for example, in addition to the radicals mentioned in the preceding paragraph, 3-thiabutyl, 3-thiapentyl, 3,6-dithiaheptyl, 3,6-dithiaoctyl, 5-hydroxy-3-oxapentyl, 5-hydroxy-3-thiapentyl or 4-hydroxybutyl.

$C_3$–$C_{20}$alkenyl is, for example, allyl, 2-methallyl, 3-methylbut-2-enyl, 3-methylbut-3-enyl, hexenyl, decenyl, undecenyl, heptadecenyl or oleyl. Preferred meanings are allyl, methallyl and oleyl.

$C_5$–$C_{12}$cycloalkyl, which may be substituted by $C_1$–$C_4$alkyl, in particular methyl, is, for example, cyclopentyl, cyclohexyl, cycloheptyl, cyclooctyl, cyclodecyl, cyclododecyl or methylcyclohexyl. Unsubstituted or substituted $C_5$–$C_8$cycloalkyl, in particular cyclohexyl, is preferred.

Examples of phenyl which is substituted, preferably monosubstituted to trisubstituted, by radicals as defined are o-, m- and p-chlorophenyl, 2,3-dichlorophenyl, 2,4-dichlorophenyl, 2,5-dichlorophenyl, 2,6-dichlorophenyl, 3,4-dichlorophenyl, 2,4,5-trichlorophenyl, 2,4,6-trichlorophenyl, o-, m- and p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 2-methyl-4-tert-butylphenyl, 2-ethylphenyl, 2,6-diethylphenyl, 2,6-diethyl-4-methylphenyl, 2,6-diisopropylphenyl, 4-tert-butylphenyl, p-nonylphenyl, 2-chloro-6-methylphenyl, 3-chloro-2-methylphenyl, 3-chloro-4-methylphenyl, 4-chloro-2-methylphenyl, 5-chloro-2-methylphenyl, 2,6-dichloro- 3-methylphenyl, o-, m- and p-methoxyphenyl, o- and p-ethoxyphenyl, 2,4-dimethoxyphenyl, 2,5-dimethoxyphenyl, 2,5-diethoxyphenyl, 2-methoxy-5-methylphenyl, 4-methoxy-2-methylphenyl, 3-chloro-4-methoxyphenyl, 3-chloro-6-methoxyphenyl, 3-chloro-4,6dimethoxyphenyl, 4-chloro-2,5-dimethoxyphenyl,o-, m- and p-hydroxyphenyl, 2-hydroxy-4-methylphenyl, 3-hydroxy-4-methylphenyl, o-, m- and p-acetylaminophenyl, o-, m- and p-nitrophenyl, p-($C_1$–$C_{12}$alkyl)oxycarbonylphenyl and p-phenyloxycarbonylphenyl.

If $Y_3$, $Y_4$ and $Y_6$ are phenylamino which is substituted, preferably monosubstituted to trisubstituted, on the phenyl radical by radicals as defined, the substituted phenyl radical can, for example, be as defined above.

$C_7$–$C_{10}$phenylalkyl is, for example, benzyl or 2-phenylethyl. Benzyl is preferred. If the phenyl group in these radicals is substituted, preferably monosubstituted to trisubstituted, by groups as defined, they can be as defined above. $C_7$–$C_{10}$Phenylalkyl which is substituted on the phenyl group by $C_1$–$C_{20}$alkyl, preferably $C_8$–$C_{14}$alkyl, is one of the preferred meanings. Dodecylbenzyl may be mentioned as a further example.

$C_2$–$C_4$alkanoyl is, for example, acetyl, propanoyl or butanoyl. Acetyl is preferred.

$C_2$–$C_4$alkoxycarbonyl is, for example, methoxycarbonyl, ethoxycarbonyl or propoxycarbonyl. Methoxycarbonyl and ethoxycarbonyl are preferred.

Di($C_1$–$C_4$alkyl)amino is, for example, dimethylamino, diethylamino, dipropylamino or dibutylamino.

$C_1$–$C_{20}$alkylamino, preferably $C_1$–$C_8$alkylamino, in particular $C_4$–$C_8$alkylamino, is, for example, butylamino, pentylamino, hexylamino, heptylamino or octylamino.

$C_3$–$C_8$cycloalkylamino is, for example, cyclopropylamino, cyclohexylamino or cyclooctylamino.

Alkylene having up to 12 carbon atoms is, for example, methylene, dimethylene, trimethylene, butylene, pentamethylene, hexamethylene, octamethylene, decamethylene or dodecamethylene. Alkylene having up to 8 carbon atoms is preferred. U.S. Pat. No. 5,155,152 contains a review.

Other possible stabilizers which can be used in addition are compounds of the formulae a and b

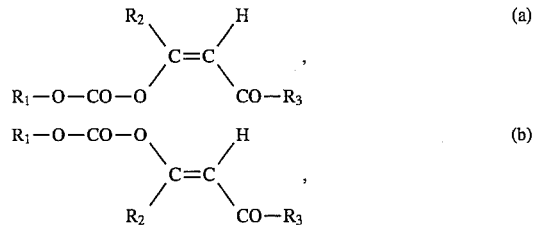

in which $R^1$ is $C_1$–$C_{22}$alkyl, phenyl, mono-or di($C_1$–$C_9$alkyl)-substituted phenyl, $C_5$–$C_7$cycloalkyl or a group of the formula A or B

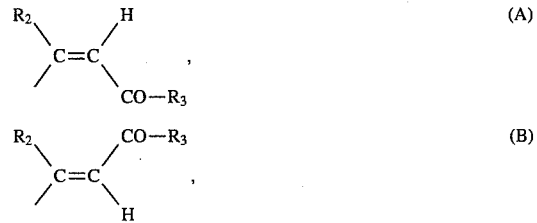

or $R^1$ is a group of the formula ca or cb

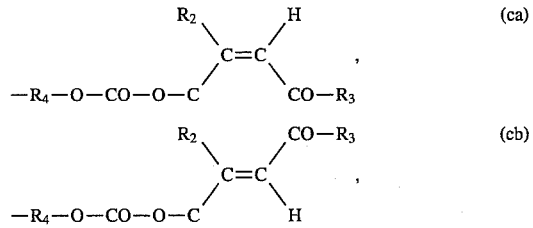

$R^2$ and $R^3$, independently of one another, are $C_1$–$C_{20}$alkyl, phenyl, mono- or di($C_1$–$C_9$alkyl)-substituted phenyl or $C_5$–$C_7$cycloalkyl, and $R^4$ is $C_2$–$C_{12}$alkylene. More detailed explanations, examples and preferences are given in EP 224 438.

Further stabilizers are triazoles of the formula

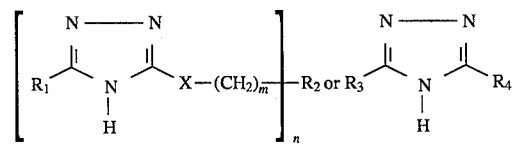

in which $R_1$ is hydrogen, hydroxyl, $C_1$–$C_6$alkoxy, carboxyl, $C_2$–$C_6$alkoxycarbonyl, mercapto, $C_1$–$C_6$alkylthio, —S—$CH_2$—COOH or —S—$CH_2$—COO—($C_1$–$C_6$)alkyl, X is thio, methylene, —COO— or —S—CH$_2$—COO—, in each case bonded to the alkyl via the ester oxygen atom, m is an integer from 1 to 20, n is 1 or 2, R$_2$, if monovalent, is hydrogen, hydroxyl or mercapto and, if divalent, is a direct bond, imino, C$_1$-C$_6$alkylimino, oxy, thio or methylene, R$_3$ is hydrogen, amino, mercapto or C$_1$-C$_{12}$alkylthio, and, if R$_3$ is hydrogen, R$_4$ is hydrogen, —COOR$_5$, in which R$_5$ is hydrogen, C$_1$-C$_8$alkyl or —CH$_2$—COO—(C$_1$-C$_8$)alkyl, or —S—R$_6$, where R$_6$ is hydrogen, C$_1$-C$_{12}$alkyl, —CH$_2$—COO—(C$_1$-C$_8$)alkyl or C$_1$-C$_{12}$ alkylthio, or

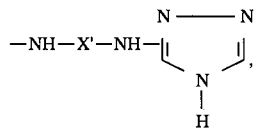

in which X' is —CO—NH—alkylene—NH—CO—, —CO—alkylene-S-alkylene—CO, in each case having 1–12 carbon atoms in the alkylene chain, or (C$_1$-C$_{12}$)alkylene, if R$_3$ is NH$_2$, R$_4$ is C$_1$-C$_4$alkyl, mercapto, C$_1$-C$_4$alkylthio or

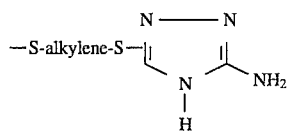

having 1–12 carbon atoms in the alkylene chain, if R$_3$ is mercapto, R$_4$ is unsubstituted or substituted phenyl, and if R$_3$ is C$_1$-C$_{12}$alkylthio, R$_4$ is C$_1$-C$_4$alkyl, C$_1$-C$_{12}$alkylthio or unsubstituted or substituted phenyl.

These stabilizers, further embodiments, examples and preferences are given in DE 3 048 659.

Stabilizer mixtures comprising a thioether of the formula (VIII)

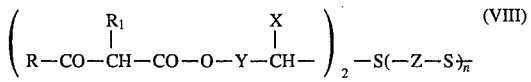

in which n is zero or 1,

R is C$_1$-C$_{18}$alkyl, C$_5$-C$_8$cycloalkyl, or unsubstituted or C$_1$-C$_4$alkyl-substituted C$_6$-C$_{10}$aryl, and R$_1$ is hydrogen or C$_1$-C$_4$alkyl, each X, as a recurring symbol, is identical to or different from the others and is hydrogen or a group of the formula

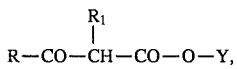

each Y, as a recurring symbol, is identical to or different from the others and is C$_1$-C$_6$alkylene or a group of the formula

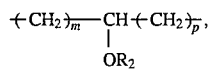

where the —(CH$_2$)$_m$— group is bonded to the oxygen atom and in which R$_2$ is hydrogen or a group of the formula

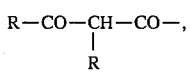

n is 1 to 4, and p is zero to 3, Z is C$_1$-C$_6$alkylene or a group of the formula $$-CH_2-CH-CH_2-, \text{ and}$$
$$\phantom{-CH_2-CH}|\phantom{-CH_2-}$$
$$\phantom{-CH_2-CH}OR_2$$

b) a stabilizer comprising a metal from the group consisting of zinc, calcium, magnesium and antimony, or furthermore zinc combined with at least one of the abovementioned metals.

Further details in this respect, examples and preferences are given in EP 19 576.

Compounds of the formula (IX)

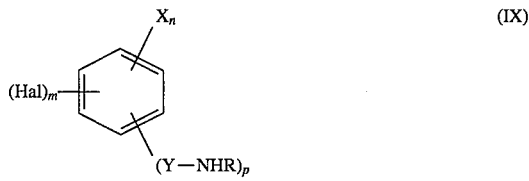

in which m is 0, 1 or 2, n is 0, 2 or 3 and p is 1 or 2,

Hal is —F, —Cl, —Br or —I,

X is —NH$_2$, —NHCH$_3$ and/or —OCH$_3$ or OC$_2$H$_5$,

Y is —CO— or —SO$_2$— and

R is —H, —OH, —NH$_2$, C$_1$-C$_{18}$alkyl which is unsubstituted or substituted by, for example, one to three HO— and/or C$_1$-C$_4$alkoxy or phenoxy groups, phenyl, benzyl or phenethyl, or R furthermore is a group of the formula

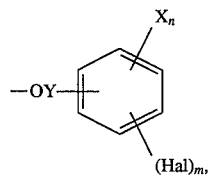

where X, Y, m, n and Hal are as defined above. Detailed descriptions, examples and preferences are given in EP 122 228 and EP 174 412.

Stabilizer mixtures obtainable by mixing at least one compound of the formula (X)

in which X is O or S, n is an integer from 1 to 5, and R is straight-chain or branched C$_1$-C$_{18}$alkyl or substituted or unsubstituted cyclohexyl, and at least one PVC stabilizer of the Me(II) carboxylate and/or Me(II) phenoxide type, where Me(II) is one or more metals from the series consisting of Ba, Sr, Ca, Mg, Zn and Cd, and where, based on the PVC, from 0.01–2% by weight of the compound of the formula I and 0.1–4% by weight of the Me(II) carboxylate and/or Me(II)phenoxide are employed. Such stabilizer mixtures are described in greater detail in EP 90 770, which also gives examples and preferences.

Examples of suitable organic plasticizers are those from the following groups:

A) Phthalates (esters of phthalic acid)

Examples of these plasticizers are dimethyl, diethyl, dibutyl, dihexyl, di-2-ethylhexyl, di-n-octyl, di-isooctyl, di-isononyl, di-isodecyl, di-isotridecyl, dicyclohexyl, dimethylcyclohexyl, dimethyl glycol, dibutyl glycol, benzyl butyl and diphenyl phthalates, and mixtures of phthalates, such as $C_7$–$C_9$— and $C_9$–$C_{11}$alkyl phthalates made from predominantly linear alcohols, $C_6$–$C_{10}$-n-alkyl phthalates and $C_8$–$C_{10}$-n-alkyl phthalates. Preference is given to dibutyl, dihexyl, di-2-ethylhexyl, di-n-octyl, di-isooctyl, di-isononyl, di-isodecyl, di-isotridecyl and benzyl butyl phthalates, and said mixtures of alkyl phthalates. Particular preference is given to di-2-ethylhexyl, di-isononyl and di-isodecyl phthalate.

B) Esters of aliphatic dicarboxylic acids, in particular esters of adipic, azelaic and sebacic acids Examples of these plasticizers are di-2-ethylhexyl adipate, di-isooctyl adipate (mixture), di-isononyl adipate (mixture), di-isodecyl adipate (mixture), benzyl butyl adipate, benzyl octyl adipate, di-2-ethylhexyl azelate, di-2-ethylhexyl sebacate and di-isodecyl sebacate (mixture). Preference is given to di-2-ethylhexyl adipate and di-isooctyl adipate.

C) Esters of trimellitic acid, for example tri-2-ethylhexyl trimellitate, tri-isodecyl trimellitate (mixture), tri-isotridecyl trimellitate, tri-isooctyl trimellitate (mixture) and tri— $C_6$–$C_8$alkyl, tri—$C_6$–$C_{10}$alkyl, tri—$C_7$–$C_9$alkyl and tri—$C_9$–$C_{11}$alkyl trimellitates. The last-mentioned trimellitates are formed by esterifying trimellitic acid by means of the appropriate alkanol mixtures. Preferred trimellitates are tri-2-ethylhexyl trimellitate and said trimellitates made from alkanol mixtures.

D) Epoxy plasticizers, such as 1,2-epoxides and oxiranes; examples thereof are epoxidized polybutadiene, epoxidized soybean oil, epoxidized linseed oil, epoxidized fish oil, epoxidized tallow, methylbutyl and 2-ethylhexyl epoxystearate, tris(epoxypropyl) isocyanurate, epoxidized castor oil, epoxidized sunflower oil, 3-(2-phenoxy)-1,2-epoxypropane, bisphenol A polyglycidyl ether, vinylcyclohexene diepoxide, dicyclopentadiene diepoxide and 3,4-epoxycyclohexylmethyl 3,4-epoxycyclohexanecarboxylate.

E) Polymer plasticizers

A definition of these plasticizers and examples thereof are given in "Taschenbuch der Kunststoff-Additive" [Handbook of Plastics Additives], edited by R. Gächter and H. Müller, Hanser Verlag, 1990, page 412, chapter 5.9.6, and in "PVC Technology", edited by W. V. Titow, 4th Ed., Elsevier Publ., 1984, pages 165–170. The most usual starting materials for the preparation of polyester plasticizers are: dicarboxylic acids, such as adipic, phthalic, azelaic and sebacic acids; diols, such as 1,2-propanediol, 1,3-butanediol, 1,4-butanediol, 1,6-hexanediol, neopentyl glycol and diethylene glycol; monocarboxylic acids, such as acetic, caproic, caprylic, lauric, myristic, palmitic, stearic, pelargonic and benzoic acids; monofunctional alcohols, such as isooctanol, 2-ethylhexanol, isodecanol and $C_7$–$C_9$alkanol and $C_9$–$C_{11}$alkanol mixtures. Particularly advantageous are polyester plasticizers made from said dicarboxylic acids and monofunctional alcohols.

F) Esters of phosphoric acid

A definition of these esters is given in the abovementioned "Taschenbuch der Kunststoff-Additive" on page 408, chapter 5.9.5. Examples of these phosphates are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tri-2-ethylhexyl phosphate and ®Reofos 50.

G) Chlorinated hydrocarbons or chlorinated paraffins

H) Hydrocarbons (paraffins)

I) Monoesters, for example butyl oleate, phenoxyethyl oleate, tetrahydrofurfuryl oleate and esters of alkylsulfonic acids.

J) Glycol esters, for example diglycol benzoates or polyol full or partial esters in general.

Definitions and examples of plasticizers from groups G) to J) are given in the following handbooks:

"Taschenbuch der Kunststoff-Additive" [Handbook of Plastics Additives], edited by R. Gächter and H. Müller, Hanser Verlag, 1990, page 422, chapter 5.9.14.2 (group G)) and chapter 5.9.14.1 (group H)).

"PVC Technology", edited by W. V. Titow, 4th Ed., Elsevier Publishers, 1984, pages 171–173, chapter 6.10.2 (group G)), page 174, chapter 6.10.5 (group H)), page 173, chapter 6.10.3 (group I)) and pages 173–174, chapter 6.10.4 (group J)).

Particular preference is given to plasticizers from groups A) to F), in particular A) to D) and F), especially the plasticizers in these groups which have been mentioned as preferred.

It is also possible to use mixtures of different plasticizers.

The plasticizers can be used in an amount of, for example, from 1 to 120 parts by weight, preferably from 1 to 100 parts by weight, in particular from 2 to 70 parts by weight, based on 100 parts by weight of PVC.

Suitable dihydropyridines are monomeric and oligomeric compounds, for example as described in EP-A-0 362 012, EP-A-0 286 887 and EP-A-0 024 754.

Suitable perchlorates are alkali metal and alkaline earth metal perchlorates and zinc and aluminium perchlorates or perchlorates whose cation comprises a surfactant ammonium or phosphonium cation, possibly also applied to supports, for example as described in U.S. Pat. No. 5,034,443. It is also possible to use adducts of these perchlorates with monohydric and polyhydric alcohols.

Examples of suitable antioxidants are:

1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, octylphenol, nonylphenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

4. Hydroxylated diphenyl thioethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

5. Alkylidenebisphenols, for example 2,2'-methylenebis(6-tert-butyl-4-methylphenol), 2,2'-methylenebis(6-tert-butyl-4-ethylphenol), 2,2'-methylene-bis[4-methyl-6-(α-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(α-methylbenzyl)-4-nonylphenol], 2,2'-methylene-his[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, his[2-(3'-tert-butyl-2'-hydroxy-5'-methylbenzyl)-6-tert-butyl-4-methyl-phenyl] terephthalate, 1,1-bis(3,5-dimethyl-2-hydroxyphenyl)butane, 2,2-bis(3,5-di-tert-butyl-4-hydroxyphenyl)propane, 2,2-bis(4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

6. O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl 3,5 -di-tert-butyl-4-hydroxybenzylmercaptoacetate.

7. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di[4-(1,1,3,3-tetramethylbutyl)phenyl]2,2-bis(3,5-di-tert-butyl-4-hydroxybenzyl)malonate.

8. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4 -hydroxybenzyl)-2,3,5,6-tetramethylbenzene, 2,4,6-tris(3,5-di-tert-butyl-4-hydroxybenzyl)phenol.

9. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5 -di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

10. Phosphonates, phosphites and phosphonites, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of monoethyl 3,5-di-tert-butyl-4-hydroxybenzyl phosphonate, triphenyl phosphite, diphenyl alkyl phosphites, phenyl dialkyl phosphites, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythfityl diphosphite, bis(2,4-di-tert-butylphenyl) pentaerythrityl diphosphite, bis(2,6-di-tert-butyl-4-methylphenyl) pentaerythrityl diphosphite, bisisodecyloxy pentaerythrityl diphosphite, bis(2,4-di-tert-butyl-6-methylphenyl) pentaerythrityl diphosphite, bis(2,4,6-tri-tert-butylphenyl) pentaerythrityl diphosphite, tristearyl sorbityl triphosphite, tetrakis(2,4-di-tert-butylphenyl)-4,4'-biphenylene diphosphonite, 6-isooctyloxy-2,4,8,10-tetra-tert-butyl-12 H-dibenz[d,g]-1,3,2-dioxaphosphocine, 6-fluoro-2,4,8,10-tetra-tert-butyl-12 -methyldibenz[d,g]-1,3,2-dioxaphosphocine, bis(2,4-di-tert-butyl-6-methylphenyl) methyl phosphite, bis(2,4-di-tert-butyl-6-methylphenyl) ethyl phosphite, $(C_9H_{19}-C_6H_4)_{1.5}$—P—(O—$C_{12-13}H_{25-27})_{1.5}$.

11. Acylaminophenols, for example 4-hydroxylauranilide, 4-hydroxystearanilide, octyl N-(3,5-di-tert-butyl-4-hydroxyphenyl)carbamate.

12. Esters of β-(3,5-di-tert-butyl-4-hydroxyphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

13. Esters of β-(5-tert-butyl-4-hydroxy-3-methylphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

14. Esters of β-(3,5-dicyclohexyl-4-hydroxyphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

15. Esters of 3,5-di-tert-butyl-4-hydroxyphenylacetic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

16. Amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

17. Esters of thiodiacetic acid and thiodipropionic acid

Preference is given to antioxidants from groups 5, 10 and 14, in particular 2,2-bis(4-hydroxyphenyl)propane, esters of 3,5-di-tert-butyl-4-hydroxyphenylpropionic acid with octadecanol or pentaerythritol, and tris(2,4-di-tert-butylphenyl) phosphite.

If desired, a mixture of antioxidants of different structures can be employed.

The antioxidants can be used in an amount of, for example, 0.01 to 10 parts by weight, preferably from 0.1 to 10 parts by weight, in particular from 0.1 to 5 parts by weight, based on 100 parts by weight of PVC.

Examples of suitable UV absorbers and light stabilizers are:

1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy )carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy 5'-(2-isooctyloxycarbonylethyl)phenylbenzotriazole, 2,2'-methylenebis[4-(1,1,3,3-tetramethylbutyl)-6-benzotriazol-2-yl phenol]; transesterification product of 2-[3-tert-butyl-5'-(2-methoxycarbonylethyl)-2'-hydroxyphenyl]benzotriazole with polyethylene glycol 300; [R—CH$_2$CH$_2$—COO(CH$_2$)$_3$]$_2$ where R=3'-tert-butyl-4'-hydroxy-5'-2H-benzotriazol-2-yl phenyl.

2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl and isooctyl α-cyano-β,β-diphenylacrylate, methyl α-carbomethoxycinnamate, methyl and butyl α-cyano-β-methyl-p-methoxycinnamate, methyl α-carbomethoxy-p-methoxycinnamate and N-(β-carbomethoxy-β-cyanovinyl)-2-methylindoline.

5. Nickel compounds, for example nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzylphosphonic acid, nickel complexes of ketoximes, such as of 2-hydroxy-4-methylphenyl undecyl ketoxime, and nickel complexes of 1-phenyl-4-lauroyl-5-hydroxypyrazole, if desired with additional ligands.

6. Sterically hindered amines, for example bis(2,2,6,6-tetramethylpiperidyl) sebacate, bis(2,2,6,6-tetramethylpiperidyl)succinate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, the product of the condensation of 1-hydroxyethyl-2,2,6,6-tetramethyl-4-hydroxypiperidine and succinic acid, the product of the condensation of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)bis-(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl) 2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the product of the condensation of N,N'-bis(2,2,6,6-tetramethyl-4-piperidyl)hexamethylene diamine and 4-morpholino-2,6-dichloro-1,3,5-triazine, the product of the condensation of 2-chloro-4,6-di(4-n-butylamino-2,2,6,6-tetramethylpiperidyl) 1,3,5-triazine and 1,2-bis(3-aminopropylamino)ethane, the product of the condensation of 2-chloro-4,6-di(4-n-butylamino-1,2,2,6,6-pentamethylpiperidyl)1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione and Chimassorb 966.

7. Oxalamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides.

8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butoxypropoxy)phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine.

Examples of suitable peroxide scavengers are: esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythrityl tetrakis(β-dodecylmercapto)propionate and ethylene glycol bismercaptoacetate.

Examples of suitable lubricants are: montan wax, fatty acid esters, PE waxes, amide waxes, polyol partial esters, partially hydrolysed PE waxes, so-called complex esters, chlorinated paraffins, glycerol esters, alkaline earth metal soaps and fatty ketones, as described in DE 4 204 887. Lubricants which can be used are also described in "Taschenbuch der Kunststoff-Additive" [Handbook of Plastics Additives], editors R. Gächter and H. Müller, Hanser Verlag, 3rd Edition, 1990, pages 443–503. Other lubricants, in particular combinations, are given in EP 0 062 813 and EP 0 336 289.

Examples of suitable polyols are: pentaerythritol, dipentaerythritol, tripentaerythritol, trimethylolethane, bistrimethylolethane, trimethylolpropane, bistrimethylolpropane, sorbitol, mannitol, xylitol, lactose, leucrose, tris(hydroxyethyl) isocyanurate, tris(dihydroxypropyl) isocyanurate, inositol, tetramethylolcyclohexanol, tetramethylolcyclopentanol, tetramethylolcyclopyranol, glycerol, diglycerol, polyglycerol, thiodiglycol, thiodiglycerol, bishydroxyethyltartaramide, hexakis(hydroxyethyl)melamin, bistrihydroxymethyloxamide, tristrihydroxymethylcitramide and α-, β- and γ-cyclodextrins.

The polyols can be used in an amount of, for example, from 0.01 to 20 parts by weight, preferably from 0.1 to 20 parts by weight, in particular from 0.1 to 10 parts by weight, particularly preferably from 0.1 to 3 parts by weight, based on 100 parts by weight of PVC.

Suitable compounds from the series consisting of the hydrotalcites, zeolites, dawsonites, magadiites, kenyaites and kanemites are both naturally occurring minerals and synthetic compounds.

Compounds from the series consisting of the hydrotalcites can be described by the general formula (XIII)

$$M^{2+}_{1-x}M^{3+}_x(OH)_2.(A^{n-})_{x/n}.mH_2O \qquad (XIII)$$

where $M^{2+}$=Mg, Ca, Sr, Zn and/or Sn, $M^{3+}$=Al, B or Bi, $A^{n-}$ is an anion having the valency n, n is a number from 1 to 4, x is a number from 0 to 0.5, and m is a number from 0 to 2.

$A^{n-}$ is preferably $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$,

$(CHOHCOO)_2^{2-}$, $(CHOH)_4CH_2OHCOO^-$.$C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$, $HPO_3^{2-}$ or $HPO_4^{2-}$.

Further examples of hydrotalcites are given in DE 41 06 403.

Other hydrotalcites which can preferably be used are compounds having the general formula (XIIIa)

$$M^{2+}_x Al_2(OH)_{2x+6nz}(A^{n-})_2.mH_2O \qquad (XIIIa)$$

where $M^{2+}$ is at least one metal from the series consisting of Mg and Zn, preferably Mg, $A^{n-}$ is an anion, preferably from the series consisting of $CO_3^{2-}$,

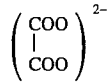

$OH^-$ and $S^{2-}$, where n is the valency of the anion, m is a positive number, preferably from 0.5 to 5, and x and z are positive numbers, x preferably being from 2 to 6 and z preferably being less than 2.

Preference is given to compounds from the series consisting of the hydrotalcites of the general formula (XIII)

$$M^{2+}_{1-x}M^{3+}_x(OH)_2.(A^{n-})_{x/n}.mH_2O \qquad (XIII)$$

where $M^{2+}$ is Mg or a solid solution of Mg and Zn, $A^{n-}$ is $CO_3^{2-}$, x is a number from 0 to 0.5, and m is a number from 0 to 2.

Very particular preference is given to hydrotalcites of the formulae $Al_2O_3.6MgO.CO_2.12H_2O$, $Mg_{4.5}Al_2(OH)_{13}.CO_3.3.5H_2O$, $4MgO.Al_2O_3.CO_2.9H_2O$, $4MgO.Al_2O_3.CO_2.6H_2O$, $ZnO.3MgO.Al_2O_3.CO_2.8-9H_2O$ or $ZnO.3MgO.Al_2O_3.CO_2.5-6H_2O$.

Zeolites can be described by the general formula (XIV)

$$M_{x/n}[(AlO_2)_x(SiO_2)_y].wH_2O \qquad (XIV)$$

where n is the charge of the cation M,

M is an element from the first or second main group, or zinc, y:x is a number between 0.8 and infinity, preferably between 0.8 and 10.5, and w is a number between 0 and 300.

Furthermore, zeolites which can be used are disclosed in "Atlas of Zeolite Structure Types", W. M. Meier and D. H. Olson, Butterworths, 3rd Edition, 1992.

Zeolites in a broader sense also include aluminium phosphates having a zeolite structure.

The preferred zeolites which are known per se have an average effective pore diameter of 3–5 Å and can be prepared by known methods. Particular preference is given to zeolites of type NaA which have an average effective pore diameter of 4 Å, and are therefore known as zeolites 4 Å.

Particular preference is given to crystalline sodium alumosilicates whose particle size is at least predominantly in the range from 1–10 μm.

In a preferred embodiment of the invention, sodium alumosilicates having rounded corners and edges can also be used.

Preference is given to compounds of the formulae $Na_{12}Al_{12}Si_{12}O_{48}.27H_2O$ [zeolite A], $Na_6Al_6Si_6O_{24}.2NaX.7.5H_2O$, X=OH, halogen, $ClO_4$ [sodalite]

$Na_6Al_6Si_{30}O_{72}.24H_2O$, $Na_8Al_8Si_{40}O_{96}.24H_2O$, $Na_{16}Al_{16}Si_{24}O_{80}.16H_2O$, $Na_{16}Al_{16}Si_{32}O_{96}.16H_2O$, $Na_{56}Al_{56}Si_{136}O_{384}.250H_2O$), [zeolite Y]

$Na_{86}Al_{86}Si_{106}O_{384}.264H_2O$ [zeolite X]

or the zeolites which can be prepared by replacement of all or some of the sodium atoms by lithium, potassium, magnesium, calcium, strontium or zinc atoms, such as $(Na,K)_{10}Al_{10}Si_{22}O_{64}.20H_2O$.

$Ca_{4.5}Na_3[(AlO_2)_{12}(SiO_2)_{12}].30H_2O$ $K_9Na_3[(AlO_2)_{12}(SiO_2)_{12}].27H_2O$.

Suitable dawsonites or more generally alumo salt compounds are, for example, those of the formula (XV)

$\{(Mt_2O)_m.(Al_2O_3)_n.Z_o.pH_2O\}$, in which Mt is H, Na, K, Li, $Mg_{1/2}$, $Ca_{1/2}$, $Sr_{1/2}$ or $Zn_{1/2}$; Z is $CO_2$, $SO_2$, $(Cl_2 O_7)_{1/2}$, $B_4O_6$, $S_2O_2$ (thiosulfate) or $C_2O_2$ (oxalate); m is a number from 1 to 3; n is a number from 1 to 4; o is a number from 2 to 4; and p is a number from 0 to 30; these can be naturally occurring minerals or synthetic compounds. The metals may have been, in part, replaced by one another. Said dawsonites are crystalline, partially crystalline or amorphous or in the form of a dried gel. The dawsonites can also be in rarer crystalline modifications. A process for the preparation of such compounds is given in EP 0 394 670. Examples of naturally occurring alumo salt compounds are indigirite, tunisite, alumohydrocalcite, para-alumohydrocalcite, strontiodresserite and hydro-strontiodresserite. Other examples of alumo salt compounds are potassium alumocarbonate $\{(K_2O).(Al_2O_3).(CO_2)_2.2H_2O\}$, sodium alumothiosulfate $\{(Na_2O).(Al_2O_3).(S_2O_2)_2.2H_2O\}$, potassium alumosulfite $\{(K_2O).(Al_2 O_3).(SO_2)_2.2H_2O\}$, calcium alumooxalate $\{(CaO).(Al_2O_3).(C_2O_2)_2.5H_2O\}$, magnesium alumotetraborate $\{(MgO).(Al_2O_3).(B_4O_6)_2.5H_2O\}$, $\{([Mg_{0.2}Na_{0.6}]_2O).(Al_2 O_3).(CO_2)_2.4,1H_2O\}$, $\{([Mg_{0.2}Na_{0.6}]_2O).(Al_2O_3).(CO_2)_2.4,3H_2O\}$ and $\{([Mg_{0.3}Na_{0.4}]_2O).(Al_2O_3).(CO_2)_{2,2}.4,9H_2O\}$.

A magadiite of the formula $Na_2Si_{14}O_{29}.n\ H_2O$ or $Na_2Si_8O_{17}.n\ H_2O$, in which n is a number from 0 to 30, is suitable.

A kenyaite of the formula $Na_2Si_{22}O_{45}.n\ H_2O$, in which n is a number from 0 to 30, is suitable.

A kanemite of the formula $Na_2Si_2O_5.n\ H_2O$, $NaHSi_2O_5.n\ H_2O$ or $Na_2Si_4\ O_9.n\ H_2O$, in which n is a number from 0 to 30, is suitable.

The magadiites, kenyaites and kanemites which can be used can be naturally occurring minerals or synthetic compounds. A process for the preparation of such compounds is given, for example, in EP 0 472 144, EP 0 615 955, EP 0 615 956, EP 0 627 383 and DE 41 07 955.

The mixed alumo salt compounds can be obtained by processes known per se by cation exchange, preferably from the alkali metal alumo salt compounds, or by combination precipitation (see, for example, U.S. Pat. No. 5,194,458).

Preference is given to alumo salt compounds of the formula (XV) in which Mt is Na or K; Z is $CO_2$, $SO_2$ or $(Cl_2O_7)_{1/2}$; m is 1–3; n is 1–4; o is 2–4 and p is 0–20. Z is particularly preferably $CO_2$.

Further preferred compounds are those which can be represented by the following formulae:

$Mt_2O.Al_2O_3.(CO_2)_2.pH_2O$      (XVa)

$(Mt_2O)_2.(Al_2O_3)_2.(CO_2)_2.pH_2O$      (XVb)

$Mt_2O.(Al_2O_3)_2.(CO_2)_2.pH_2O$      (XVc)

where Mt is a metal, such as Na, K, $Mg_{1/2}$, $Ca_{1/2}$, $Sr_{1/2}$ or $Zn_{1/2}$ and p is a number frown 0 to 12.

Also preferred is a magadiite of the formula $Na_2Si_{14}O_{29}.6H_2O$ and a kenyaite of the formula $Na_2Si_{22}O_{45}.7\ H_2O$ Preference is given to a stabilized halogen-containing polymer comprising (a) PVC or recyclate thereof, (b) a di- or polysaccharide alcohol of the formula $C_6H_{11}O_6(C_6H_{10}O_5)_nC_6 H_{13}O_5$, in which n is a number from 0 to 5, and (c) 0.001–5.0 parts by weight, per 100 parts by weight of PVC, of an inorganic or organic zinc compound; and, if desired, a phenolic antioxidant, in particular 0.1–5.0 parts by weight per 100 parts by weight of PVC.

Particular preference is given to a stabilized halogen-containing polymer in which component (b) is a disaccharide alcohol.

Very particular preference is given to a stabilized halogen-containing polymer in which component (b) is maltitol, lactitol, isomaltitol or palatinitol.

Preference is furthermore given to a stabilized halogen-containing polymer which additionally comprises a β-diketone and/or an Mg, Ca or Zn salt thereof, or a β-ketoester.

Preference is furthermore given to a stabilized halogen-containing polymer which additionally comprises an epoxide.

Preference is furthermore given to a stabilized halogen-containing polymer which additionally comprises a monomeric, oligomeric or polymeric dihydropyridine.

Preference is furthermore given to a stabilized halogen-containing polymer which additionally comprises an inorganic or organic calcium compound.

Preference is furthermore given to a stabilized halogen-containing polymer which additionally comprises a phosphite, a perchlorate compound, a polyol, a hydrotalcite, a zeolite, a dawsonite, a magadiite, a kenyaite or a kanemite.

Particular preference is given to a stabilized halogen-containing polymer which, in addition to (a), (b) and (c), comprises a β-diketone and/or an Mg, Ca or Zn salt thereof, or a β-ketoester and a monomeric, oligomeric or polymeric dihydropyridine.

Particular preference is furthermore given to a stabilized halogen-containing polymer which, in addition to (a), (b) and (c), comprises a β-diketone and/or an Mg, Ca or Zn salt thereof, or a β-ketoester and a polyol, a hydrotalcite, a zeolite, a dawsonite, a magadiite, a kenyaite or a kanemite.

Particular preference is furthermore given to a stabilized halogen-containing polymer which, in addition to (a), (b) and (c), comprises a perchlorate compound and a polyol, a hydrotalcite, a zeolite, a dawsonite, a magadiite, a kenyaite or a kanemite.

Particular preference is furthermore given to a stabilized halogen-containing polymer which, in addition to (a), (b) and (c), comprises an epoxide and a perchlorate compound.

The two last-mentioned combinations may additionally comprise a β-Diketone, an Mg, Ca or Zn salt thereof or a β-ketoester, or mixtures thereof.

All combinations may additionally comprise a calcium soap and/or a lubricant.

The present invention furthermore relates to a stabilizer mixture comprising a di- or polysaccharide alcohol of the formula $C_6H_{11}O_6(C_6H_{10}O_5)_NC_6H_{13}O_5$, in which n is a number from 0 to 5 and an inorganic or organic zinc, aluminium or rare-earth compound, where, if the disaccharide alcohol is maltitol, the composition does not comprise a combination of a calcium and zinc soap. The abovementioned preferences apply to the individual mixture constituents, and the stabilizer mixture can also contain the other constituents described above.

The present invention furthermore relates to the use of a di- or polysaccharide alcohol of the formula $C_6H_{11}O_6(C_6H_{10}O_5)_nC_6H_{13}O_5$, in which n is a number from 0 to 5 in combination with an inorganic or organic zinc, aluminium or rare-earth compound, where, if the disaccharide alcohol is maltitol, the composition does not comprise a combination of a calcium and zinc soap, for the stabilization of a halogen-containing polymer or polymer recyclate. The abovementioned preferences apply to the individual stabilizers and to the halogen-containing polymer itself, and in addition one of the other constituents described above can also be used.

The halogen-containing polymer stabilized according to the invention can be prepared in a manner known per se, to which end said stabilizers and, if desired, further additives are mixed with the halogen-containing polymer using equipment known per se, such as calenders, mixers, compounders, extruders and the like.

The halogen-containing polymer stabilized in accordance with the present invention can be converted into the desired shape in a known manner. Methods of this type are, for example, grinding, calendering, extrusion, injection moulding, sintering or spinning, furthermore extrusion blow moulding or conversion by the plastisol process. The stabilized halogen-containing polymer can also be converted into foams.

The halogen-containing polymer according to the invention is particularly suitable for semirigid and flexible formulations, in particular in the form of flexible formulations for wire sheaths and cable insulations, which is particularly preferred. In the form of semirigid formulations, the halogen-containing polymer according to the invention is particularly suitable for decorative films, foams, agricultural sheeting, tubes, sealing profiles and office films.

In the form of rigid formulations, the halogen-containing polymer stabilized according to the invention is particularly suitable for hollow articles (bottles), packaging films (thermoformed films), blown films, crash-pad films (automobiles), tubes, foams, heavy profiles (window frames), lightwall profiles, building profiles, sidings, fittings, office films and equipment housings (computers and domestic applicances).

Examples of the use of the halogen-containing polymer according to the invention as plastisols are artificial leather, floor coverings, textile coatings, wall coverings, coil coatings and automobile underseal.

Examples of sintered applications of the halogen-containing polymer stabilized according to the invention are slush, slush mould and coil coatings.

The examples below illustrate the invention in greater detail without representing a limitation. Parts and percentages are, as in the remainder of the description, by weight, unless stated otherwise.

EXAMPLES 1–4

A PVC composition is prepared by mixing the individual components as shown in Table 1 below (amounts in pans by weight).

The constituents are homogenized for 5 minutes in mixing rolls at 180° C. giving a film with a thickness of 0.3–0.5 mm.

The long-term stability is determined in accordance with DIN 53381, in which the sample is stored in a test oven at 180° C. and the time taken for the sample to blacken is determined (Test 1).

A further measure of the stability is determined in the dehydrochlorination test, which is carried out in accordance with DIN 53381, Part 3, where the time taken for the dehydrochlorination curve to rise (exceeding of a conductivity of 200 µS) is determined at 180° C. (Test 2).

A further measure of the stability is determined by pressing the films at 180° C. and 200 bar for 2 minutes to give sheets with a thickness of 2 mm, whose yellowness index is determined in accordance with ASTM D 1925–70 (Test 3).

TABLE 1

| Component | Comp. 1 | Comp. 2 | Ex. 1 | Ex. 2 | Ex. 3 | Ex. 4 |
|---|---|---|---|---|---|---|
| PVC 1 | 100 | 100 | 100 | 100 | 100 | 100 |
| L 1 | 0.6 | 0.6 | 0.6 | 0.6 | 0.6 | 0.6 |
| L 2 | 0.2 | 0.2 | 0.2 | 0.2 | 0.2 | 0.2 |
| ESO | 2 | 2 | 2 | 2 | 2 | 2 |
| Zn 1 | 0.4 | 0.4 | 0.4 | 0.4 | 0.4 | 0.4 |
| MSA |  | 0.4 |  |  |  |  |
| DSA 1 |  |  | 0.4 |  |  |  |
| DSA 2 |  |  |  | 0.4 |  |  |
| DSA 3 |  |  |  |  | 0.4 |  |
| DSA 4 |  |  |  |  |  | 0.4 |
| Test 1 | 30 | 55 | 65 | 65 | 70 | 75 [min] |
| Test 2 | 18 | 44 | 46 | 46 | 47 | 51 [min] |
| Test 3 | — | 83 | 76 | 77 | 71 | 75 |

The novel PVC mixtures exhibit higher stability than the comparative samples (Comp. 1 and Comp. 2).

EXAMPLES 5 AND 6

A PVC composition is prepared by mixing the individual components as shown in Table 2 below (amounts in parts by weight).

The constituents are homogenized for 5 minutes in mixing rolls at 180° C. giving a film with a thickness of 0.3–0.5 mm.

The long-term stability is determined in accordance with DIN 53381, in which the sample is stored in a test oven at 180° C. and the yellowing is measured.

TABLE 2

| Component | Comp. 3 | Comp. 4 | Ex. 5 | Ex. 6 |
|---|---|---|---|---|
| PVC 1 | 100 | 100 | 100 | 100 |
| L 1 | 0.6 | 0.6 | 0.6 | 0.6 |
| L 2 | 0.2 | 0.2 | 0.2 | 0.2 |
| ESO | 2 | 2 | 2 | 2 |
| Ca 1 | 0.3 | 0.3 | 0.3 | 0.3 |
| Zn 1 | 0.4 | 0.4 | 0.4 | 0.4 |
| DSA 1 |  | 0.1 |  |  |
| DSA 3 |  |  | 0.1 |  |
| DSA 4 |  |  |  | 0.1 |

After 85 minutes, sample Comp. 4 has a YI value of 90.0, whereas the novel samples (Ex. 5 and 6) have a YI value of only 80.7 and 74.0 respectively. Comp. 3 darkens after only 60 minutes.

EXAMPLES 7–10

A PVC composition is prepared by mixing the individual components as shown in Table 3 below (amounts in parts by weight).

The constituents are homogenized for 5 minutes in mixing rolls at 170° C. giving a film with a thickness of 0.3–0.5 mm.

The thermal stability is determined in accordance with DIN 53381, in which the sample is stored in a test oven at 170° C. and the time taken for the sample to blacken is determined.

TABLE 3

| Component | Comp. 5 | Ex. 7 | Ex. 8 | Ex. 9 | Ex. 10 |
|---|---|---|---|---|---|
| PVC 1 | 100 | 100 | 100 | 100 | 100 |
| DOP | 57 | 57 | 57 | 57 | 57 |
| ESO | 3 | 3 | 3 | 3 | 3 |
| Zn 1 | 0.4 | 0.4 | 0.4 | 0.4 | 0.4 |
| DSA 1 |  | 0.4 |  |  |  |

TABLE 3-continued

| Component | Comp. 5 | Ex. 7 | Ex. 8 | Ex. 9 | Ex. 10 |
|---|---|---|---|---|---|
| DSA 2 | | | 0.4 | | |
| DSA 3 | | | | 0.4 | |
| DSA 4 | | | | | 0.4 |

The sample Comp. 5 darkens after 20 minutes, whereas the samples according to the invention (Examples 7–10) darken only after 50 minutes.

The following substances are used in the above examples:

PVC 1: Evipol SH 7020 (S-PVC, K value 71)
Ca 1: Calcium stearate
DOP: Dioctyl phthalate
DSA 1: Maltitol
DSA 2: Lactitol
DSA 3: Isomaltitol
DSA 4: Palatinitol
ESO: Epoxidized soybean oil
L 1: Lubricant Loxiol G 16
L 2: PE wax
MSA: Sorbitol
Zn 1: Zinc stearate

What is claimed is:

1. A stabilized halogen-containing polymer comprising
   (a) a halogen-containing polymer or a recyclate thereof,
   (b) a di- or polysaccharide alcohol of the formula $C_6H_{11}O_6(C_6H_{10}O_5)_nC_6H_{13}O_5$, in which n is a number from 0 to 5; and (c) an inorganic or organic zinc, aluminium or rare-earth compound, where, if component (b) is maltitol, the composition does not comprise a combination of a calcium and zinc soap.

2. A stabilized halogen-containing polymer according to claim 1, wherein component (a) is PVC or recyclate thereof and, if desired, a phenolic antioxidant, in an amount of an amount of 0.1–5.0 parts per 100 parts of PVC.

3. A stabilized halogen-containing polymer according to claim 1, wherein component (b) is a disaccharide alcohol.

4. A stabilized halogen-containing polymer according to claim 1, wherein component (b) is maltitol, lactitol, isomaltitol or palatinitol.

5. A stabilized halogen-containing polymer according to claim 1, which additionally comprises a β-diketone and/or an Mg, Ca or Zn salt thereof or a β-ketoester.

6. A stabilized halogen-containing polymer according to claim 1, which additionally comprises an epoxide.

7. A stabilized halogen-containing polymer according to claim 1, which additionally comprises a monomeric, oligomeric or polymeric dihydropyridine.

8. A stabilized halogen-containing polymer according to claim 1, which additionally comprises an inorganic or organic calcium compound.

9. A stabilized halogen-containing polymer according to claim 1, which additionally comprises a phosphite, a perchlorate compound, a polyol, a hydrotalcite, a zeolite, a dawsonite, a magadiite, a kenyaite or a kanemite.

10. A stabilized halogen-containing polymer according to claim 1, which additionally comprises a β-diketone and/or an Mg, Ca or Zn salt thereof or a β-ketoester and a monomeric, oligomeric or polymeric dihydropyridine.

11. A stabilized halogen-containing polymer according to claim 1, which additionally comprises a β-diketone and/or an Mg, Ca or Zn salt thereof or a β-ketoester and a polyol, a hydrotalcite, a zeolite, a dawsonite, a magadiite, a kenyaite or a kanemite.

12. A stabilized halogen-containing polymer according to claim 1, which additionally comprises a perchlorate compound and a polyol, a hydrotalcite, a zeolite, a dawsonite, a magadiite, a kenyaite or a kanemite.

13. A stabilized halogen-containing polymer according to claim 1, which additionally comprises an epoxide and a perchlorate compound.

14. A stabilizer mixture comprising
    a di- or polysaccharide alcohol of the formula $C_6H_{11}O_6(C_6H_{10}O_5)_nC_6H_{13}O_5$, in which n is a number from 0 to 5;
    and an inorganic or organic zinc, aluminium or rare-earth compound, where, if the disaccharide alcohol is maltitol, the composition does not comprise a combination of a calcium and zinc soap.

15. A process for the preparation of a stabilized halogen-containing polymer, which comprises mixing a stabilizer mixture comprising
    a di- or polysaccharide alcohol of the formula $C_6H_{11}O_6(C_6H_{10}O_5)_nC_6H_{13}O_5$, in which n is a number from 0 to 5;
    and an inorganic or organic zinc, aluminium or rare-earth compound, where, if the disaccharide alcohol is maltitol, the composition does not comprise a combination of a calcium and zinc soap;
    as such or in the form of its individual constituents, and, if desired, further additives with a halogen-containing polymer or polymer recyclate using mixing devices which are calenders, mixers, compounders, or extruders.

* * * * *